E. TURGEON.
WIRE COILING MACHINE.
APPLICATION FILED FEB. 2, 1920.
1,382,258.
Patented June 21, 1921.
10 SHEETS—SHEET 10.
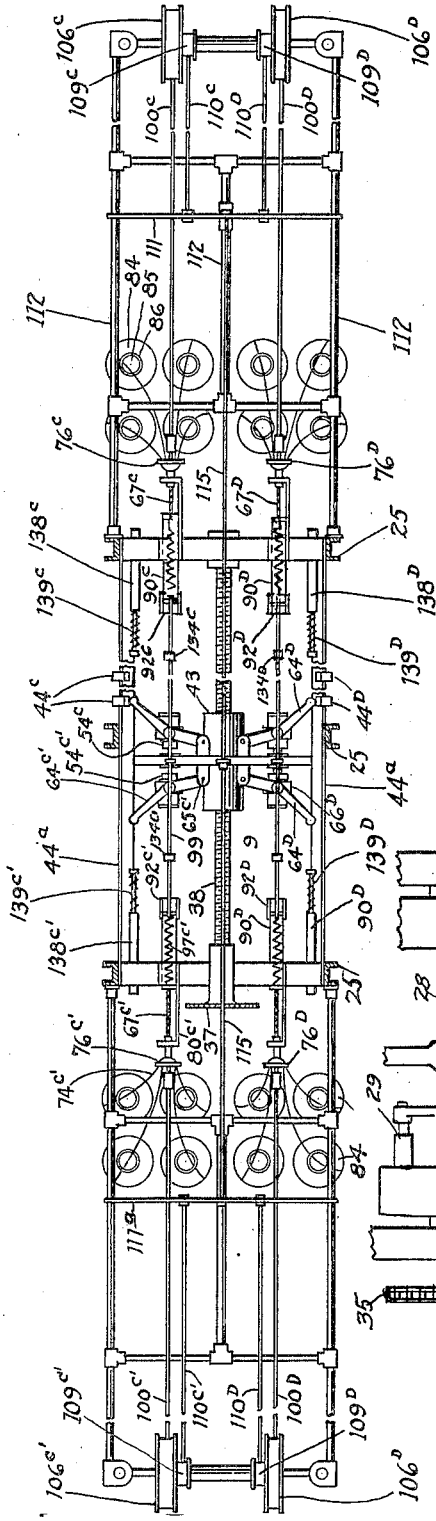
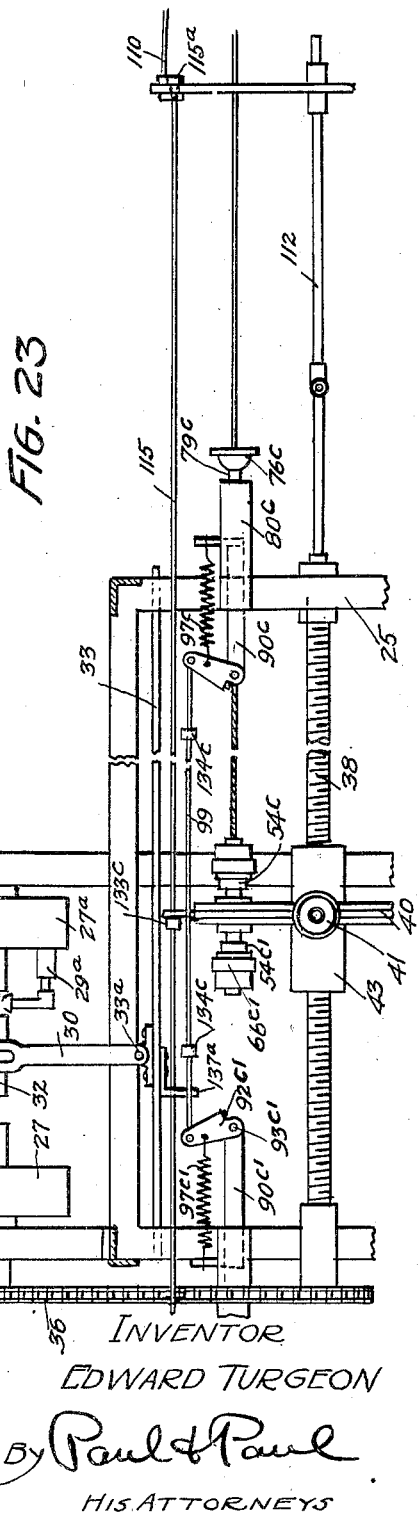
INVENTOR
EDWARD TURGEON
By Paul & Paul
HIS ATTORNEYS

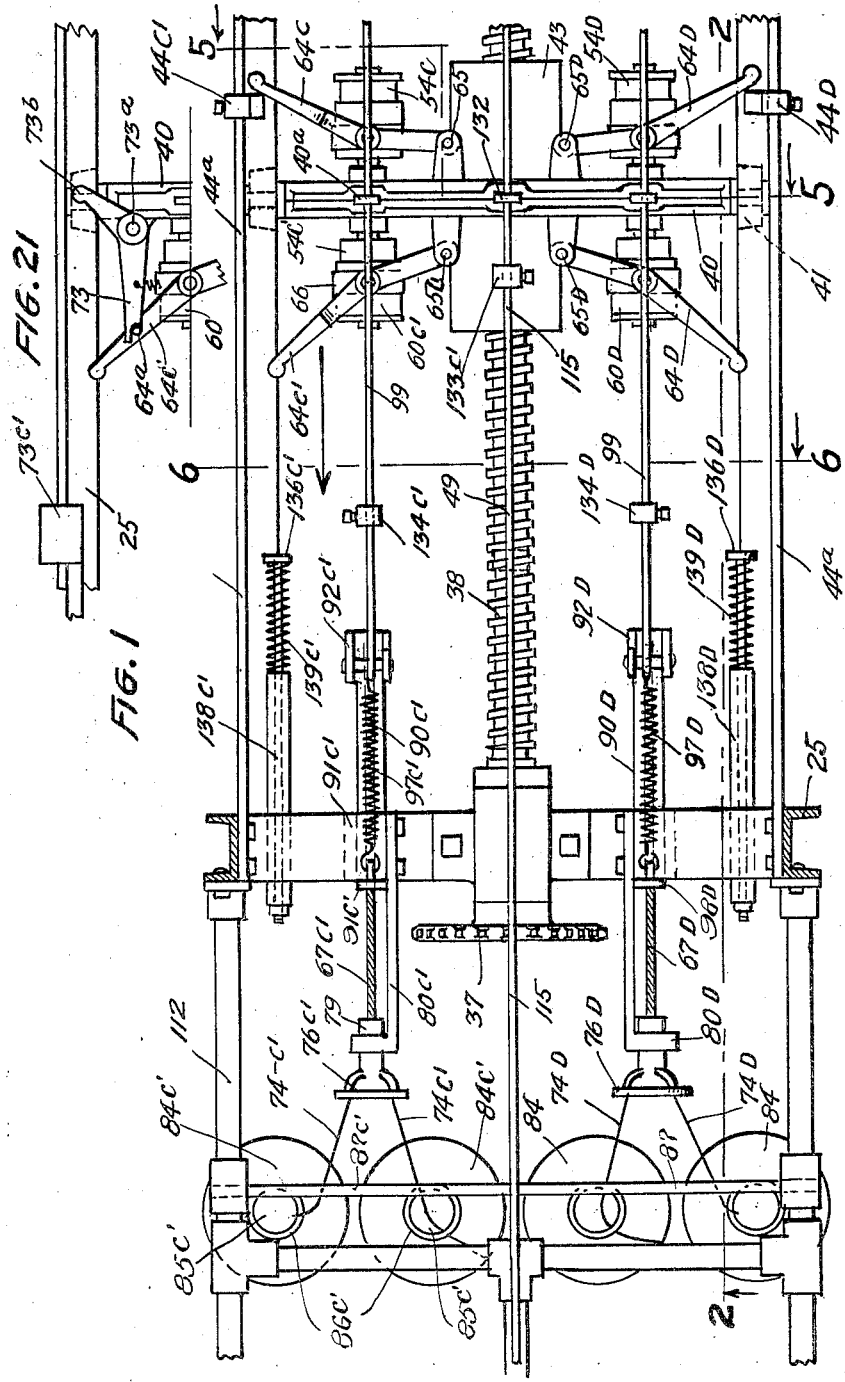

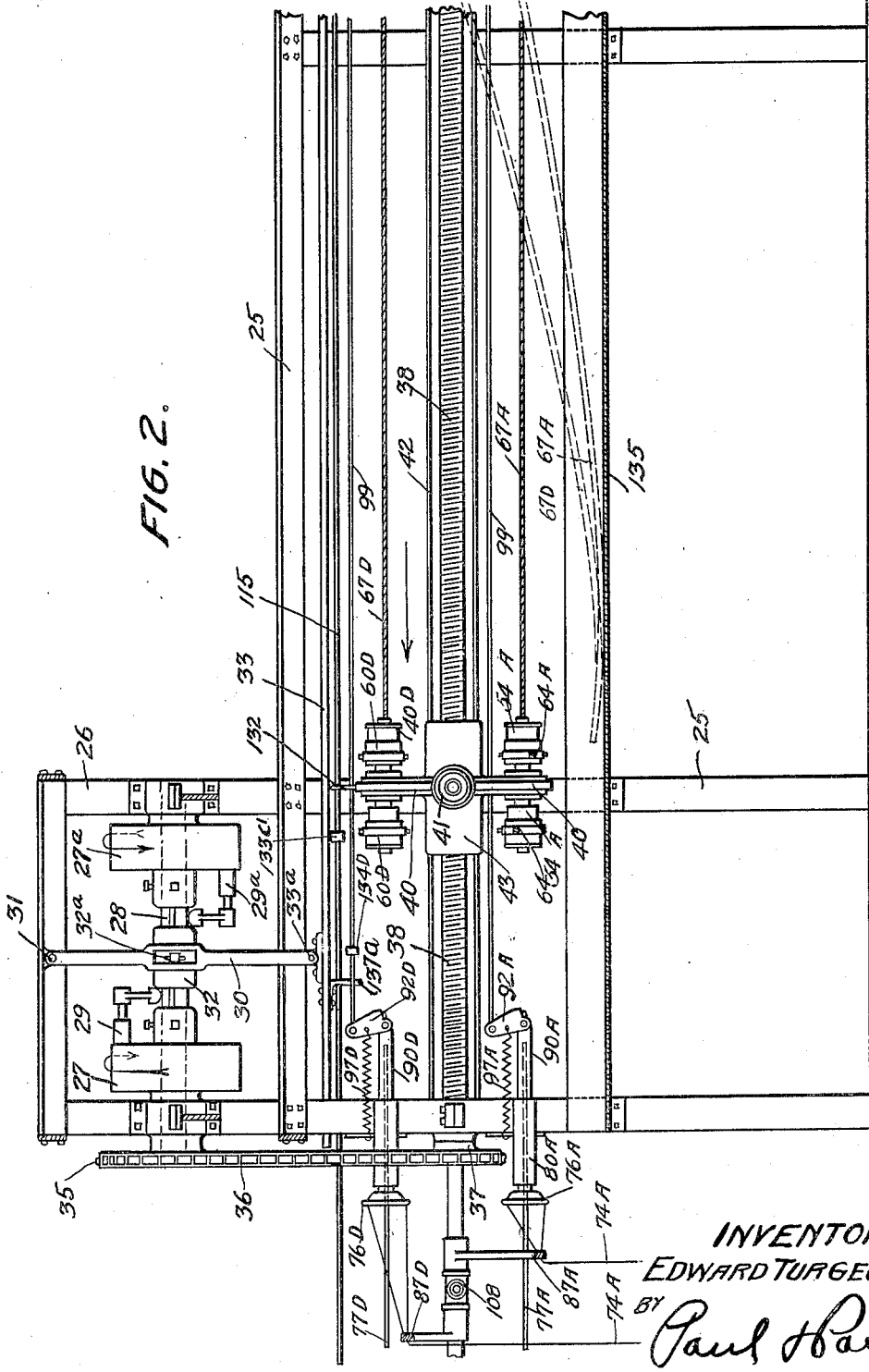

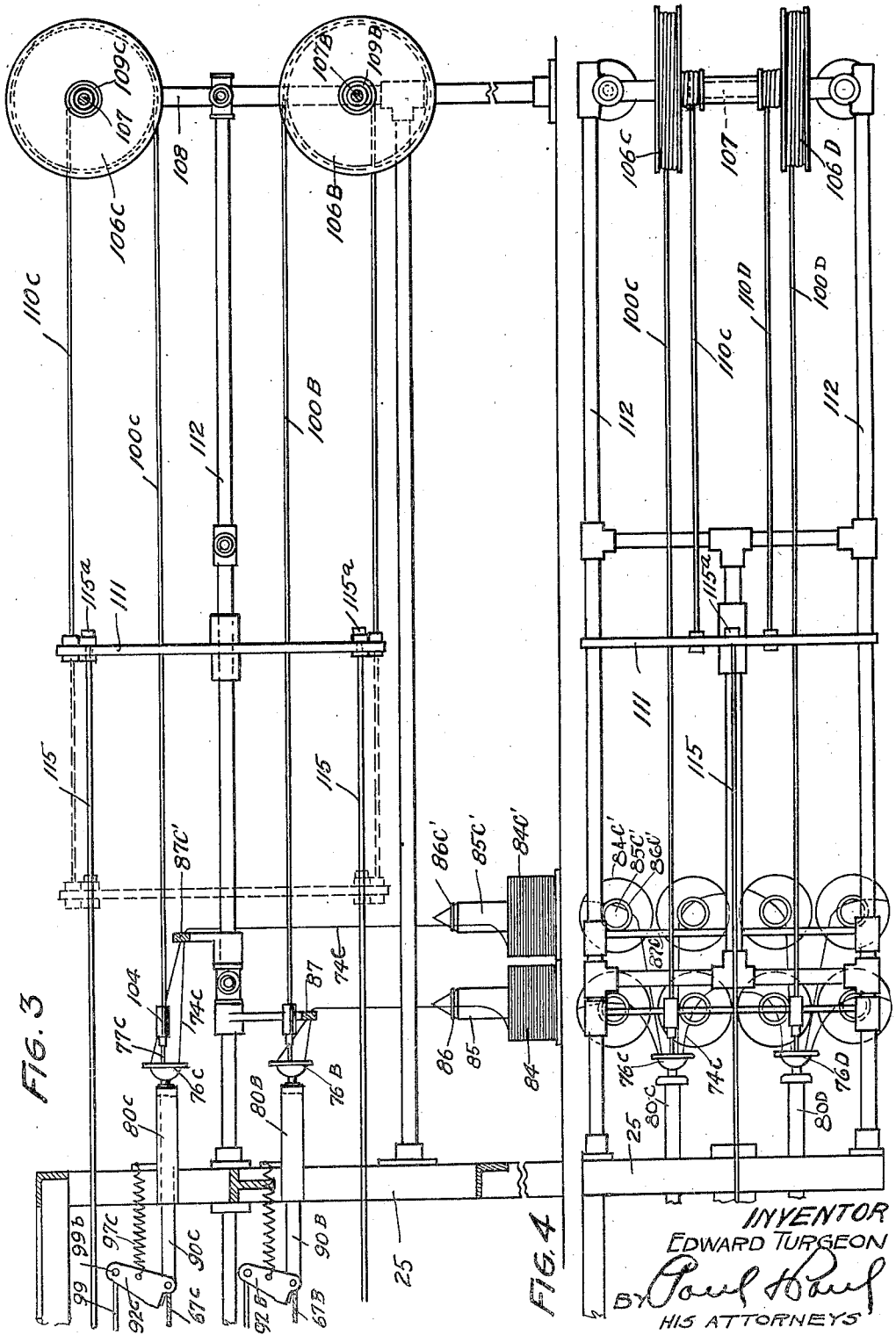

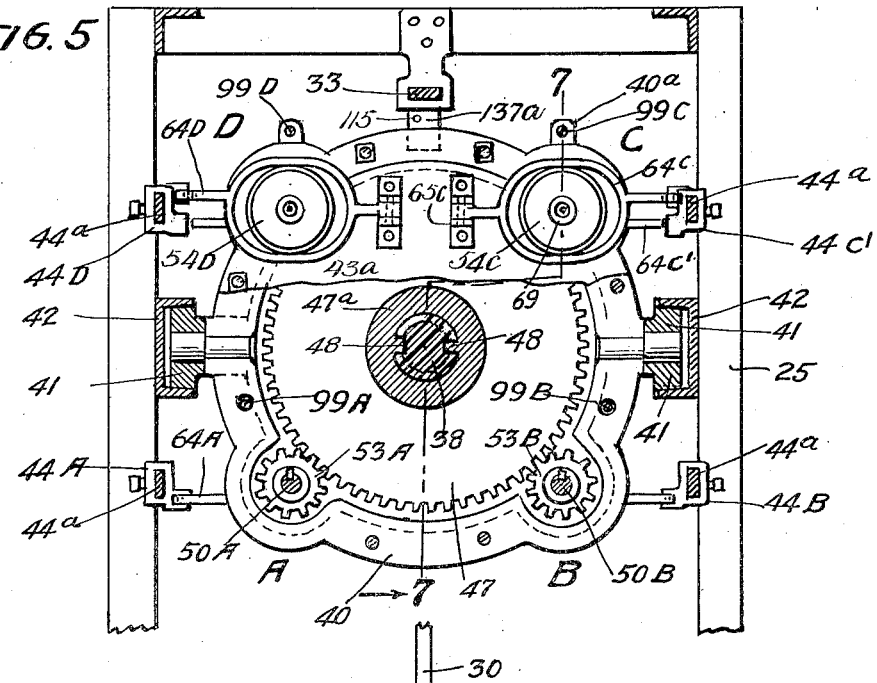
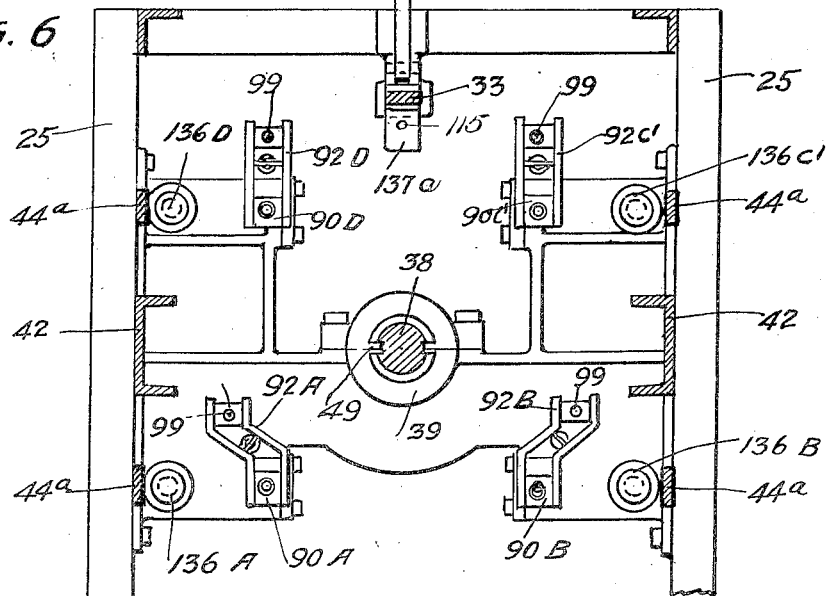

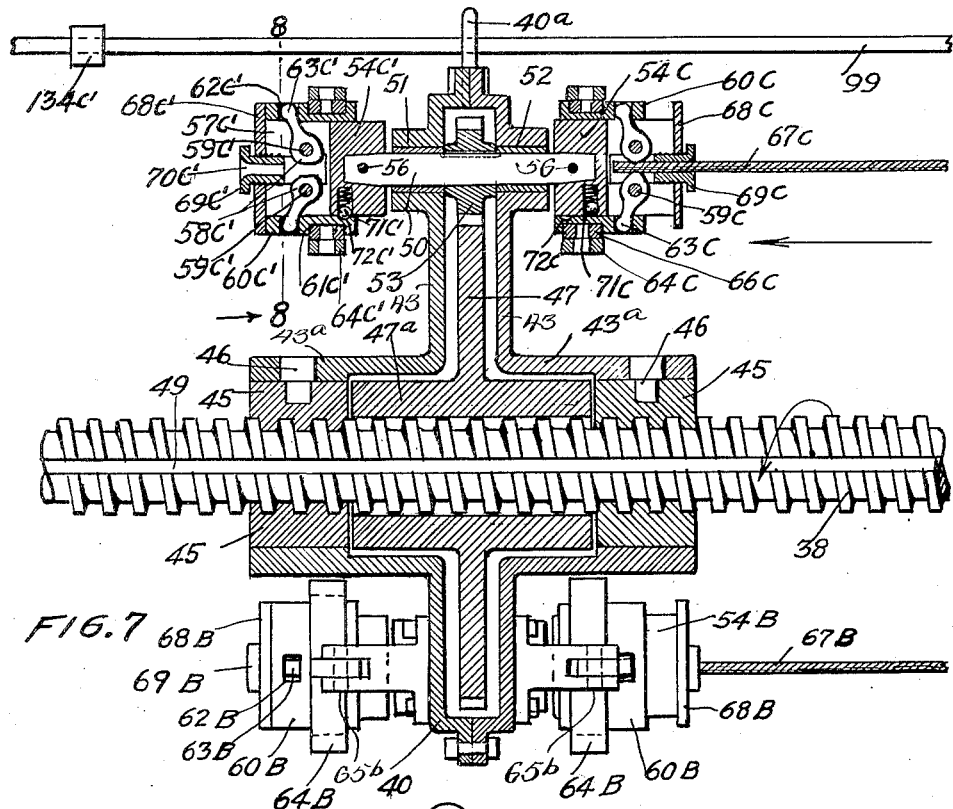
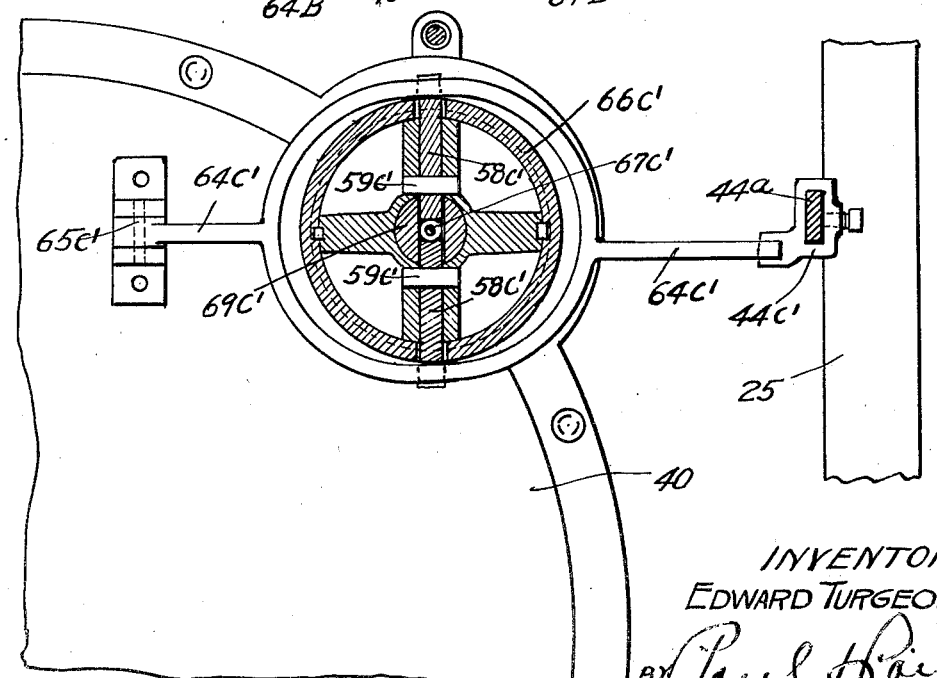

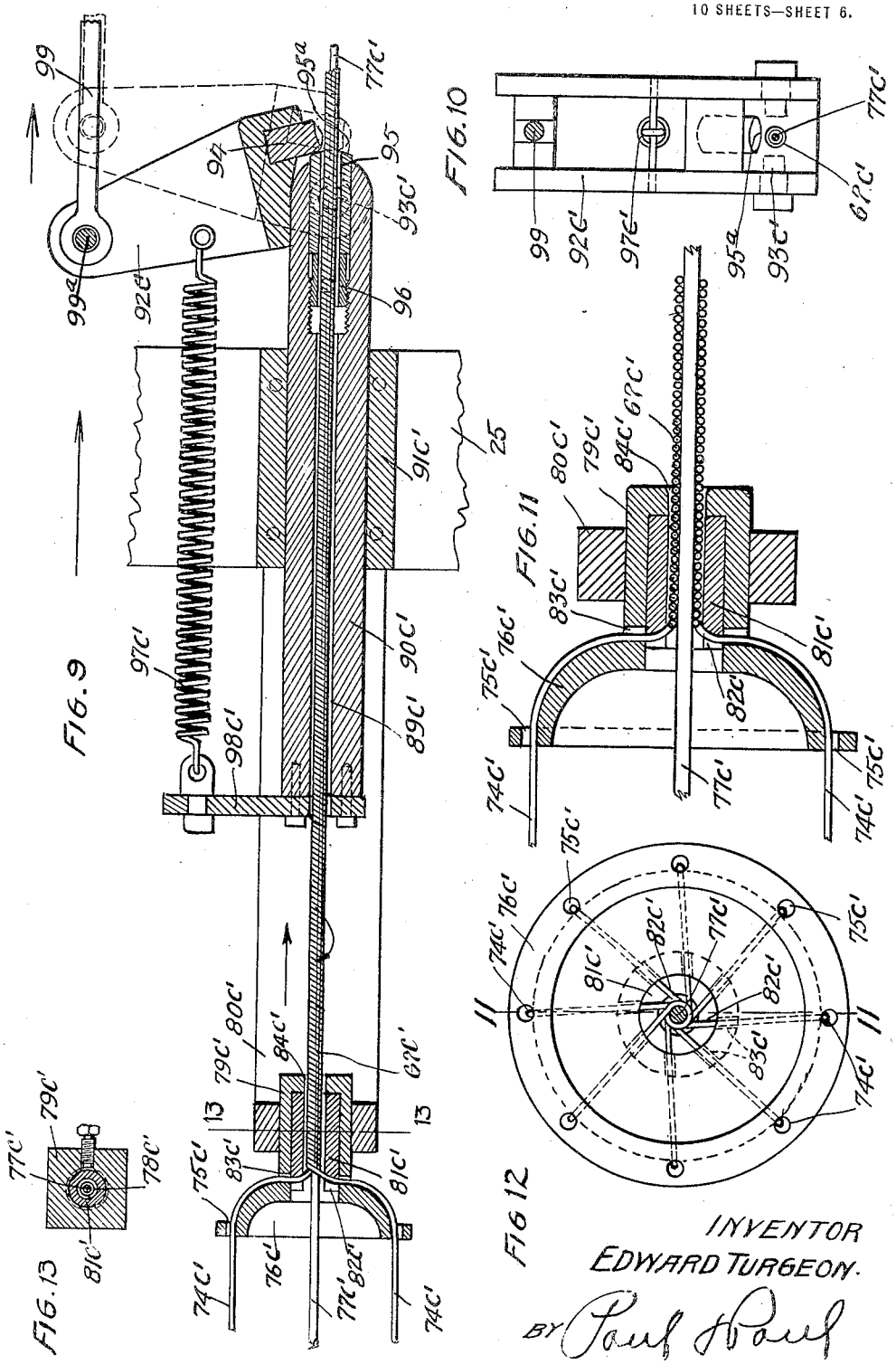

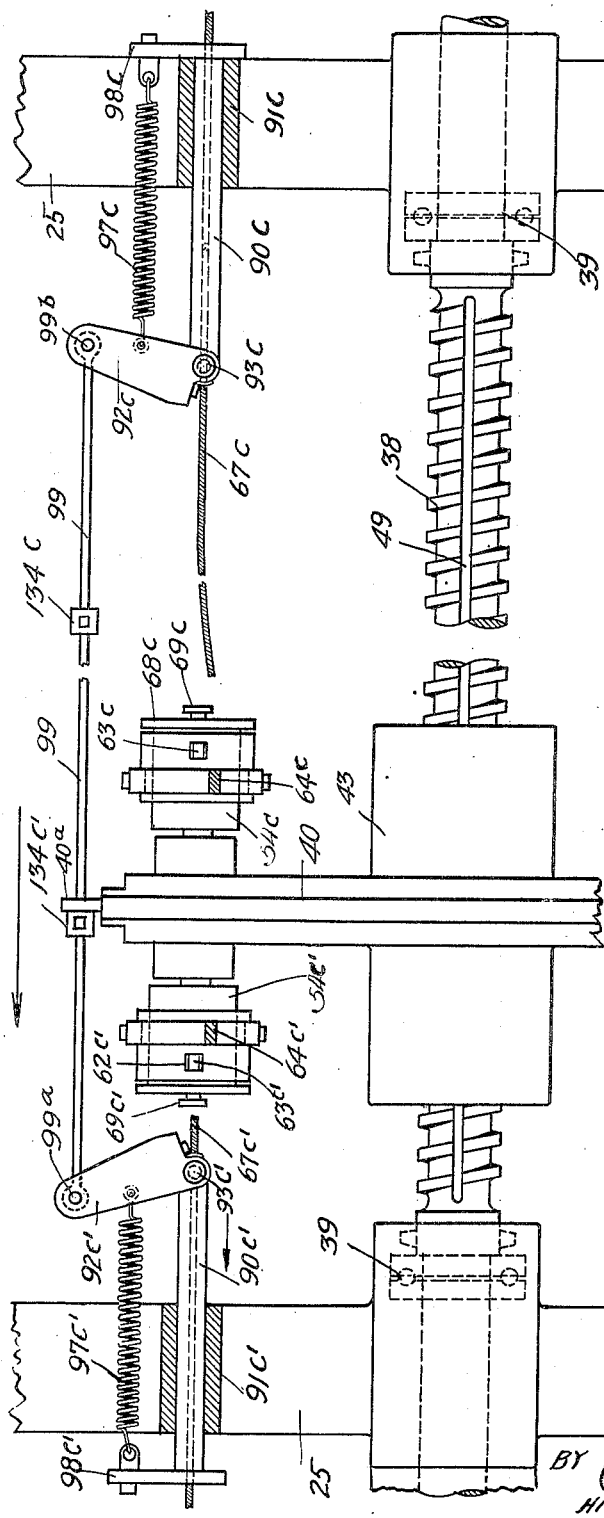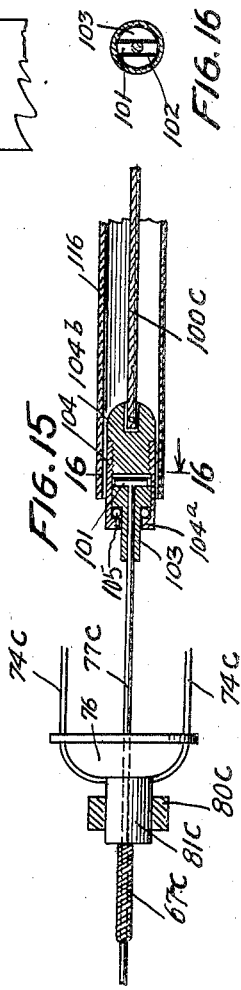

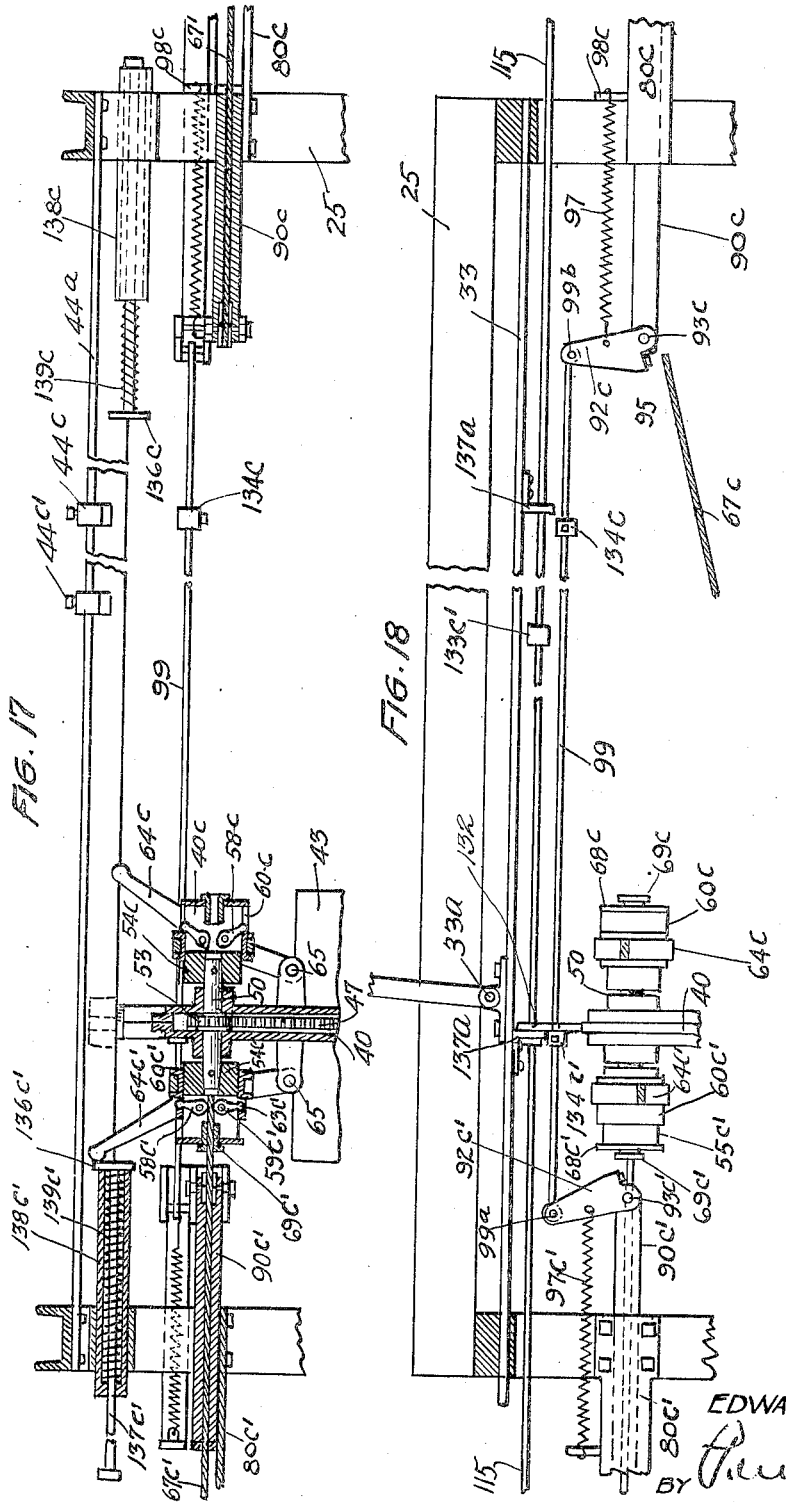

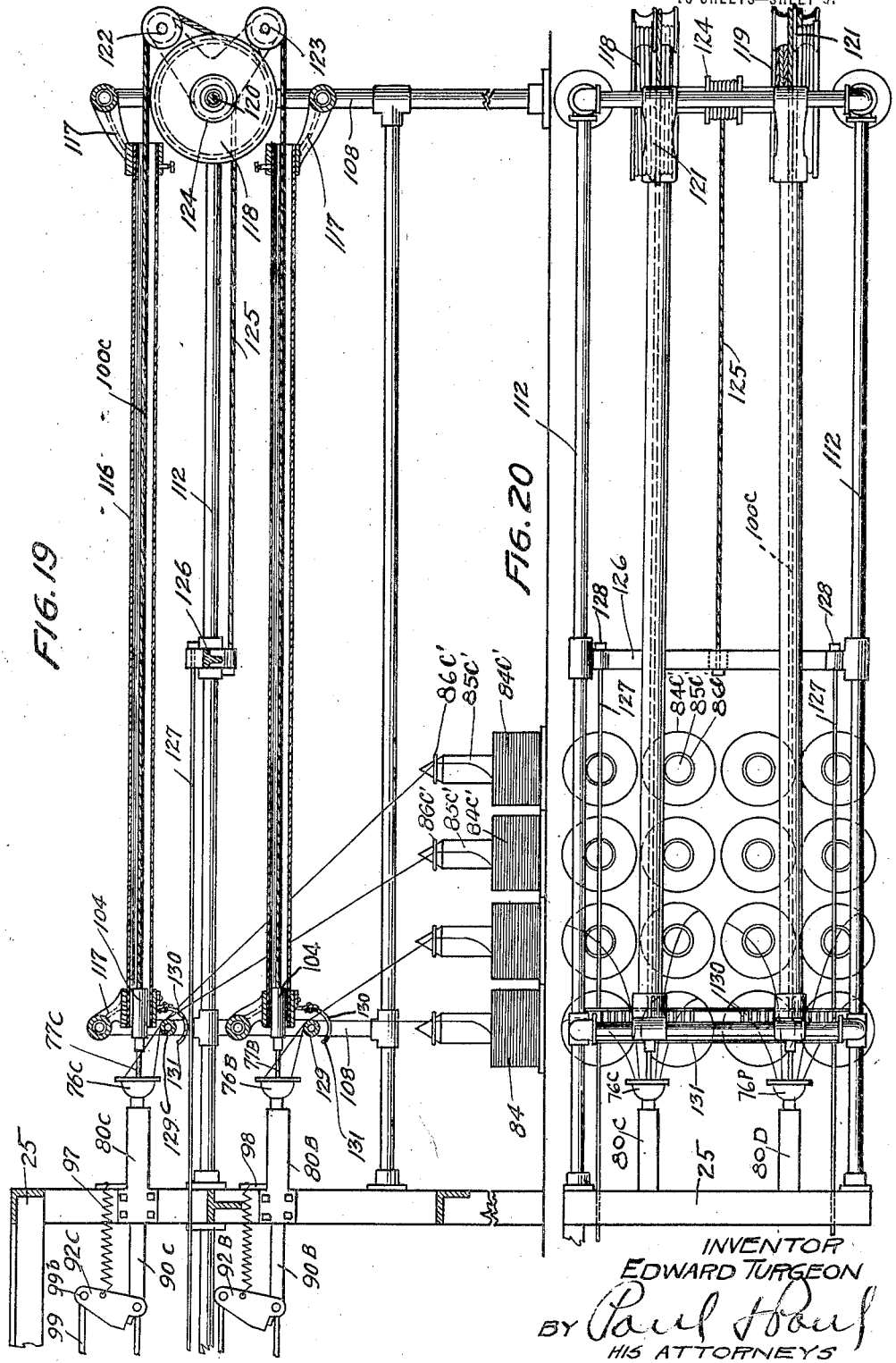

UNITED STATES PATENT OFFICE.

EDWARD TURGEON, OF MINNEAPOLIS, MINNESOTA.

WIRE-COILING MACHINE.

1,382,258. Specification of Letters Patent. Patented June 21, 1921.

Application filed February 2, 1920. Serial No. 355,694.

*To all whom it may concern:*

Be it known that I, EDWARD TURGEON, a citizen of the United States, residing at Minneapolis, county of Hennepin, State of Minnesota, have invented certain new and useful Improvements in Wire-Coiling Machines, of which the following is a specification.

My invention relates to the manufacture of spirally wound hollow wire cables, principally used for bed or other furniture springs. Heretofore it has been customary to coil each wire and insert it in the cable separately and continue this process until the requisite number of wires to form the cable is inserted. This naturally is a slow and expensive method of manufacture, and furthermore, difficulties are frequently encountered in adjusting the coiling mechanism to continually produce the exact length of pitch or helix of the coil to properly close the open space between the coils with the requisite number of wires to form a uniformly closed hollow cable. Especially in inserting the last wire it is often found that the space left between the wires is either too small to permit the ready insertion of the last wire or too great for one wire to perfectly close up the space between the coils.

The object of my invention is, therefore:

First, to provide a machine for the rapid and cheap manufacture of these cables in which all the wires constituting the completed cable are coiled simultaneously around a common core, the helix of the coil or the rate of advance of the coiler for each coil being exactly proportioned to the combined diameters of the number of wires used to produce a uniform and firmly closed cable;

Second, to further augment the capacity of the machine by making provision for coiling a series of cables at the same time;

Third, to provide simple and inexpensive mechanism that will not require close adjustment and that will not easily get out of order.

My invention consists in the constructions and combinations hereinafter described in the specification, and particularly pointed out in the claims.

In the drawings:

Figure 1 is a plan sectional view of the driving end of a machine constructed according to my invention, Fig. 2 is a longitudinal vertical section on the line 2—2 of Fig. 1 of the same end of the machine, Fig. 3 is a similar sectional view of the opposite end of the machine, Fig. 4 is a plan view of Fig. 3, Fig. 5 is a transverse vertical section on the line 5—5 of Fig. 1, Fig. 6 is a similar section on the line 6—6 of Fig. 1, Fig. 7 is a longitudinal vertical section on the line 7—7 of Fig. 5, Fig. 8 is a sectional view on a larger scale on the line 8—8 of Fig. 7, Fig. 9 is a sectional view of the wire feeding and cutting device, Fig. 10 is an end view of Fig. 9, Fig. 11 is an enlarged sectional view on the line 11—11 of Fig. 12, of the wire feed head and coil showing the core around which the wires are coiled, Fig. 12 is an end view of Fig. 11, Fig. 13 is a section on the line 13—13 of Fig. 9, Fig. 14 is a sectional view of parts on opposite ends of the machine, illustrating the operation of the machine, Fig. 15 is a detail of the core removing mechanism, Fig. 16 is a section on the line 16—16 of Fig. 15, Fig. 17 is a plan view of sections of the machine illustrating its operation, Fig. 18 is a vertical elevation of Fig. 17, Figs. 19 and 20 are respectively sectional elevation and plan of a modified form of core removing mechanism, Fig. 21 is a modified preferred form of a locking device for the gripper sleeve shown in Fig. 7.

Fig. 22 is a plan view of the machine.

Fig. 23 is a side elevation showing on a larger scale, some of the parts shown in Fig. 22.

*General features of machine.*

This machine embodies in general a suitable frame with a longitudinally reciprocating carriage, and a number of wire coiling units, each unit comprising a pair of oppositely facing wire gripping and coiling heads, mounted on said carriage, with a stationary coil former located at each end of the machine, permitting a core and a series of wires surrounding the core to be grasped by the coiling head, thereby, as the carriage moves in either direction, causing a series of wires, and the core surrounded by them, to be drawn along by the movement of the carriage, the rotating head at the same time acting in conjunction with the stationary former to coil the wires around the central core. The machine also embraces means for releasing the wires and the core from the gripping and coiling head, when the reciprocating carriage approaches the limit of its movement and thereafter withdrawing the core from the coiled wires and cutting off the prescribed length of the formed coil. This operation is repeated, with the coiling head on the other side of the carriage and the former at the other end of the machine. When the carriage next reaches the limit of its movement the ends of the wires from which the length of coiled cable had previously been severed and the end of the core arranged therein, are grasped by the grippers of the coiling head so that when the carriage again reverses and travels in the opposite direction, these wires and the core are in turn drawn through the coil former by the longitudinal movement of the coiling head.

The machine is, therefore, automatic, requiring only to have the wire supply renewed from time to time. As many units as desired may be provided in the machine. I have used and show in the accompanying drawings four units, whereby four cables are formed at each forward movement of the carriage and a like number are also formed at each backward movement of the carriage. For convenience of description I have designated the units on the inclosed drawings by the general reference characters A, B, C and D. As the units are alike except as to one or two minor details hereinafter pointed out, I consider it necessary to describe in detail the construction and operation of a single unit only.

*The machine frame and driving mechanism.*

In the drawings 25 represents the main frame of the machine upon which the principal mechanisms of the apparatus are mounted and supported. This frame may be of any preferred form and construction. It is preferably provided at its ends with the frame extensions 112, which support the core withdrawing devices, as hereinafter described. Arranged preferably at one end of the main frame structure 25 is an upward frame extension or superstructure 26, which has mounted therein, in suitable bearings, a driving shaft 28 having arranged thereon the oppositely rotating driving pulleys 27 and 27$^a$. Suitable clutches 29, 29$^a$, are provided whereby either of said driving pulleys may be clutched to the shaft 28 causing said shaft to be driven in either direction according as one pulley or the other is clutched thereto. These clutches are controlled by a suitable lever 30, preferably pivoted to the frame 26 at 31, and having its opposite end connected at 33$^a$ to a slidable operating bar 33. The lever 30 is connected, as at 32$^a$, with a sliding clutch operating sleeve 32. A sprocket 35 on the shaft 28 transmits power from this shaft through a sprocket chain or belt 36 to a sprocket or pulley 37 on a longitudinally extending screw shaft 38 journaled centrally in bearings 39 at the ends of the frame 25. (See Fig. 14.)

By this means when the machine is in operation the screw shaft 38 is rotated in one direction or the other according to whether one or the other of the pulleys 27 or 27$^a$ is clutched to the shaft 28. When the reciprocating carriage hereinafter described reaches substantially the end of its travel, in either direction a projection, indicated at 137 or 137$^a$ on the shift rod 33 (see Figs. 5 and 18,) is engaged by a plate of the carriage, and is thereby moved to reverse the clutches and the action of the driving mechanism.

*The reciprocating carriage.*

The reciprocating carriage, as a whole, is designated by the reference numeral 40. This carriage, which is shown most clearly in detail in Figs. 1, 5 and 7 of the drawings, is preferably formed of two substantially circular recessed plates 43, each having a central hub 43$^a$. Internally threaded nuts 45, fitting the screw shaft 38, are secured in the hubs 43$^a$, preferably by means of pins 46. A gear 47 having a hub 47$^a$ is slidably mounted on the shaft 38, but is connected to said shaft by means of splines 48 extending into longitudinal grooves or ways running lengthwise of the shaft. (See Fig. 5.)

It will be noted in Fig. 5 that one of the lugs 137$^a$ on the shift rod 33 projects downward into position to be encountered by the upper part of the plates forming the carriage. As the carriage nears the end of its travel in one direction its upper part encounters the projection 137$^a$ on the shift rod 33, moving said shift rod in one direction, and when the carriage approaches the limit of its movement in the opposite direction, its upper part engages the projection 137 and moves the shift rod 33 in the opposite direction.

*The coiling and gripping heads.*

The carriage has mounted therein for each unit of the machine a coiling and gripping head that is preferably double. I mean by this that for each unit of the machine there is mounted in the carriage a double-ended gripping and coiling head, with one end facing toward each end of the machine frame. Each coiling and gripping head is adapted to grip the ends of the wires and the core of each cable section, drawing said wires and core along with the carriage as the carriage moves away from the end of the machine at which the wires thus engaged are supplied.

(For convenience in this specification I will specifically describe herein the machine unit designated generally by the reference letter C, and which I will call the "C" unit. I will also designate those elements of the unit at the right of the upwardly extending portion of the carriage in Fig. 7 with an appropriate reference numeral followed by the reference character C, and those at the left of the upwardly extending portion of the carriage with a corresponding reference numeral followed by the reference character C'. I will also designate those elements of the machine that coöperate specifically with said elements with appropriate reference numerals followed by the character C, or C', as the case may be. In so far as it is necessary to designate the parts by reference numerals or characters I will mark the elements of the A, B and D units with reference numerals corresponding to those used for the C unit, followed, in each instance, by the appropriate reference character A, B or D.)

Referring particularly to the parts disclosed in the upper portion of Fig. 7 of the drawings, I mount in the bearings 51, 52, of the reciprocating carriage a spindle 50 for each unit of the machine. These spindles are arranged axially parallel with the screw shaft 38 and radially and equi-distant around the hub 43$^a$ of the carriage 40. A pinion 53 is provided on each spindle 50, being secured thereto, and each pinion 53 meshes with the gear 47. Mounted upon each end of the spindle 50 is a coiling and gripping head. Referring to the upper left-hand part of Fig. 7, the head here shown is designated 54$^{C'}$. It is preferably secured upon one end of the spindle 50 by a driving taper fit and may also be additionally secured by a pin 56. A transverse slot 57$^{C'}$ is formed in the outer end of the head. Cam grippers 58$^{C'}$, having a limited space between them, are arranged in the transverse slot 57$^{C'}$, and are pivoted upon pins 59$^{C'}$. A sleeve 60$^{C'}$, having a circular groove 61$^{C'}$ and rectangular slots 62$^{C'}$, is arranged to slide upon the head 54$^{C'}$. Arms 63$^{C'}$, of the grippers 58$^{C'}$, are engaged in the slots 62$^{C'}$, and a gripper lever 64$^{C'}$, pivoted to the carriage at 65$^{C'}$ (see Fig. 8), is connected to a ring 66$^{C'}$ which fits loosely in the groove 61$^{C'}$ of the sleeve 60$^{C'}$. A stationary cam block 44$^{C'}$ is arranged upon a bar 44$^a$ in the path of the end of the lever 64$^{C'}$, and operates to swing said lever, when it passes the cam block, to move the sleeve 60$^{C'}$ outward (Figs. 1, 5 and 8).

When this sleeve is moved outward, as on the head 54$^{C'}$ at the upper left hand part of Fig. 7, the cam grippers 58$^{C'}$ are rocked on their pivots to open the space between them, thereby putting these parts in position to receive between them the end of a coiled cable 67$^{C'}$. (See at the right in Fig. 7, and at the left in Fig. 17.)

When the gripper arms are in the inward position (as in head marked 54$^{C'}$ (at the right in Fig. 7), the wire cable, here marked 67$^C$, is gripped tightly. A stop plate 68$^{C'}$ is provided at the end of the head 54$^{C'}$ in which is centrally arranged a hardened plug 69$^{C'}$, having an outwardly flaring aperture 70$^{C'}$, for the automatic reception of the end of the wire cable, after the desired length of cable has been severed therefrom.

Means are preferably provided for holding the sleeve 60$^{C'}$ in the outward position, shown at the left in Fig. 7, with the cam grippers separated as shown in the same figure, until the sleeve is forcibly moved inward and the gripping arms are caused to grip against the end of the cable inserted between them. For this purpose I may provide a spring tensioned ball 71$^{C'}$, arranged in a hole in the head 54$^{C'}$, and adapted to seat in a notch 72$^{C'}$ in the sleeve 60$^{C'}$, as shown at the left in the upper part of Fig. 7. This device will lock the sleeve in the outward position shown at the upper left hand part of Fig. 7 with the cam grippers separated as shown in said figure. A predetermined amount of pressure, however, applied to the projecting arm 64$^{C'}$ connected to the ring 66$^{C'}$ will force the sleeve 60$^{C'}$ inward to the position shown at the right in the upper part of Fig. 7, clamping the end of the cable and core between the gripper arms, as indicated at the right-hand upper part of said Fig. 7.

Instead of using the spring seated ball for locking the sleeve in its outer position with the grippers open, I may provide the locking device shown in Fig. 21, in which a spring tensioned bell crank 73, pivoted to the carriage 40 at 73$^a$, engages a lug 64$^a$ on the lever 64$^{C'}$ and holds the sleeve against inward movement. When in the operation of the machine the sleeve is to be moved inward to close the grippers 58$^{C'}$, as will hereinafter appear, the crank arm 73$^b$ strikes a stationary lug 73$^{C'}$ on the frame of the machine, removing the arm 73 from the lug 64$^a$, after which the lever 64$^{C'}$ may be moved to close the grippers 58$^{C'}$, as hereinafter described.

As previously stated, as both of the coiling heads 54$^C$ and 54$^{C'}$ are fixed upon opposite ends of the same spindle 50, and as these heads and the parts arranged in connection therewith are duplicated upon the opposite faces of the carriage 40, this element may be considered as a double-ended coiler. While I prefer to use the double-ended coilers and thereby to form a cable with each unit at both the forward and backward movements of the carriage, I do not wish to be limited to such construction, as it is obvious that many of the advantages of my invention may be obtained by using a single-ended coiling head, and forming a coil only during one movement of the carriage.

I have indicated at the lower portion of Fig. 7, in side elevation, the double-ended coiler of the unit B, and I have marked the various elements with reference numerals corresponding to the numerals used in describing the elements of unit C, shown in the upper portion of Fig. 7, following each of said reference numerals with the letter B to designate that the same are parts of the machine unit B indicated at the lower right hand part of Fig. 7. I have also in several of the other figures of the drawings designated parts corresponding to elements of unit C, C', with corresponding reference figures followed by the letter A or the letter D. (See particularly Figs. 1, 2 and 5 of the drawings). As the coiling heads and means for operating the same in units A, B and D, are similar to those in unit C, I have not described the same herein.

In Figs. 8, 10, 11 and 12 I have illustrated means, which, in conjunction with the movable carriage and the coiling head, form the cable for the C unit of the machine, this cable being designated on these figures of the drawings as $67^{C'}$. For this purpose I provide a stationary bell-shaped assembler and coil former $76^{C'}$, having holes $75^{C'}$, arranged near its outer circumference, and through which wires $74^{C'}$ are drawn around a core $77^{C'}$ about which the cable is wound. I prefer to employ eight wires for forming this cable, although I do not restrict myself to this exact number as I may employ more or less if found desirable. The former $76^{C'}$ is secured by means of a hub $79^{C'}$ to a bracket $80^{C'}$ carried by the frame of the machine. (See Figs. 1, 9 and 11.) A series of holes $83^{C'}$ extend through the hub close to the outer bell surface of the former, these holes preferably extending on lines substantially tangential to the surface of the core $77^{C'}$, when said core is in position in the machine (see Fig. 12), thereby giving a spiral direction to the entering wires. I also prefer to provide a hardened steel bushing $81^{C'}$, having slots coinciding with the inclined holes $83^{C'}$ in the hub of the former $76^{C'}$. This bushing is arranged within the hub of the former (Figs. 9, 11 and 13), and may be secured in position by a suitable set screw (Fig. 13).

A central aperture $84^{C'}$ is provided through the plug $81^{C'}$ and hub $79^{C'}$ through which the core and the cable wires, coiled about the core, pass.

*The wire supply.*

The wires $74^{C'}$, which form the cable for the C unit, are supplied from suitable coils $84^{C'}$. (Fig. 1.) These coils may be arranged on the floor upon which the machine is supported. They are preferably provided with cores $85^{C'}$, having loose guide rings $86^{C'}$ (see also Fig. 19) under which the wires pass, and from thence through slotted bars $87^{C'}$ (see Fig. 1) to the holes $75^{C'}$, in the assembler $76^{C'}$ as already described. Similar coils are provided for the other units of the machine.

*The slidable guide and cutter.*

Arranged in front of the coil former $76^{C'}$ is a slidable guide and cutter bar $90^{C'}$ (Fig. 9) having a tubular aperture $89^{C'}$ extending through it. This guide is preferably rectangular in cross section and it is mounted to slide freely toward the coil former, in a bearing $91^{C'}$ in the machine frame 25. The opening through the guide is substantially of the same size as the opening in the bushing $81^{C'}$ of the former, and is in line therewith, so that as the spirally coiled cable, with its inclosed core is drawn forward by the movable carriage and coiling head it passes through the opening in said guide $90^{C'}$.

This bar carries a cutter arm $92^{C'}$ pivoted at $93^{C'}$ and having a hardened steel shearing plug 94. It is operated by a rod 99 connected to a pivot pin $99^a$ at the upper end of the arm. (See Fig. 9.) A spiral spring $97^{C'}$ is connected to the arm $92^{C'}$ at one end, and its opposite end is connected to a bracket $98^{C'}$ secured to the guide-bar $90^{C'}$.

A steel plug 95 having a hardened curved shearing end $95^a$ is inserted in the end of the guide bar $90^{C'}$ and its position therein may be adjusted by means of a threaded sleeve 96 fitting internal threads on the bar $90^{C'}$. The spring $97^{C'}$ holds the arm $92^{C'}$ backwardly inclined against the bar $90^{C'}$, in which position the shearing plug 94 is raised above the cable as shown in full lines in Fig. 9 of the drawings.

Assuming that the parts are standing as shown in Fig. 14 of the drawings, and the carriage 40 is advancing in the direction shown by the arrow in said figure, a section of cable will have been formed at the right of the carriage 40 in said figure by the movement toward the left, of the carriage and the right hand coiling head $54^c$. As the carriage approaches the limit of its movement toward the left in Fig. 14, the projection $40^a$ at the top of the carriage (Figs. 1, 5 and 14) will engage a lug or collar $134^{C'}$ on the cutter bar connecting rod 99, and moving said rod with the carriage will first slide the guide bar until the rear bracket $98^c$ strikes the bearing $91^c$ thereafter causing the rear cutter bar (right hand in Fig. 14), to be turned upon its pivot pin $93^c$, and the shearing plug 94 to sever the coil close to the end of the plug 95. (Fig. 18.) The shearing of the cable is performed, as will be noted, substantially at the end of the sliding guide and cutter bar and in proximity to the stationary coil former. The distance between the end of this guide and former leaves a section of the coiled cable projecting from the former and extending through said guide and cutter bar, after the cable is severed at the end of the guide. It will be noted that the cable is severed at the end of the guide and cutter bar, and as the wire releasing device may be operated at any predetermined point in the travel of the carriage the length of the severed cable will be equal to the distance between the gripping and coiling head and the end of said guide and cutter bar at the time when the gripping and coiling head releases the wires.

The distance, therefore, represented by the extent of movement of the carriage away from the end of the guide and cutter bar, at the time the wires are released by the grippers on the coiling head, determines the length of the cables that will be formed by the machine.

Withdrawal of cores.

The shearing operation of the cable, as already stated, is performed at the opposite end of the machine from that at which the carriage stands at the end of its travel, and the core, about which the cable is formed, must be withdrawn before the cable is severed. To effect this removal of the core I provide an automatic mechanism actuated through the movement of the carriage, when approaching the end of its travel, for withdrawing the core preparatory to the severing operation. It will be understood that each end of the machine is equipped with core-removing mechanism for each unit alternately made operative as the carriage approaches the completion of its travel in each direction. One of these mechanisms, that for the C unit, actuated when the carriage is near the end of its travel toward the left, I will now describe in detail.

A flexible cable $100^c$ (see Figs. 3, 4 and 15) is attached to the outer end of the core $77^c$, and, as the core is revolving in unison with the coiling head $54^c$ on the carriage 40 as it moves forward, a swiveled thrust bearing connection between the core $77^c$ and flexible cable $100^c$ is provided. The rear end of the core has a cross bar or pin 101 engaged in a slot 102 of a shouldered swivel head 103 arranged within a sleeve 104. The shoulder of the head 103 and a flange $104^a$ of the sleeve 104 form a ball race in which run a series of balls 105. See Fig. 15. The head 103 turns with the core $77^c$ through the pin 101 and a plug $104^b$ to which the flexible cable $100^c$ is attached is secured to the sleeve 104 and holds the pin 101 in place. (Fig. 15.)

Referring now to Figs. 3 and 4, where the core $77^c$ is shown in its most forward position, just before the cable $67^c$ is completed and released, it will be seen that the flexible cable $100^c$, for removing the core $77^c$, passes from the plug $104^c$ backward and around a large drum $106^c$ to which the end of the cable $100^c$ is secured after passing several times around the drum. The drum $106^c$ is mounted on a shaft 107 having bearings in an auxiliary frame 108 and a small drum $109^c$ is attached to the drum $106^c$ around which is wound a flexible cable $110^c$. This cable has one end attached to the small drum $109^c$ and the other end to a cross frame 111, slidably supported on the longitudinal frame members 112. It is evident with this construction and the considerable difference in the diameters of the drums $106^c$ and $109^c$ that a short movement of the cross frame 111 to the left in Fig. 3 will move the cable $100^c$ to the right a much greater distance and withdraw the core $77^c$ from the hollow coiled cable a corresponding distance. A rod 115, having a head or nut $115^a$ passes loosely through holes in the cross frame 111 and forms the medium by which the cross frame is moved and the core removed from the cable $67^c$, as will be hereinafter further explained. This rod extends from one end of the machine to the other and is connected in a similar way to a cross frame, $111^a$, at the opposite end of the machine (Fig. 22). The rod 115 is preferably arranged below the shift rod 33 and passes through its lugs $137^a$. (See Figs. 5 and 6.)

A modified and preferred form of the core-removing mechanism is shown in Figs. 19 and 20. To prevent sagging of the flexible cable $100^c$ of the core $77^c$ when it is withdrawn, I provide tubes 116, supported in brackets 117 on the auxiliary frame 108, through which the cable $100^c$ runs and through which the swivel head 104 may slide. Two large winding drums 118 and 119, are mounted upon a single shaft 120 and have partitions 121 dividing each drum for the reception of two of the cables $100^c$, the upper cables running over an idler pulley 122 and the lower cables under an idler 123, all winding around the drums in the same direction. A single small diameter drum 124 is arranged upon the shaft 120 upon which a flexible cable 125 is wound, one of its ends being secured to the drum and the other end fastened to a cross bar 126 slidably mounted upon the longitudinal frame members 112. Rods 127 having driving heads 128 pass loosely through the cross bar 126 and passing to the other end of the machine, are connected to another similar sliding cross bar.

By sliding the cross bars 126, when the carriage nears the limit of its travel, the cores may be drawn back in the cables so that their ends are slightly back of the points where the cables are cut off, in position to be grasped by the cam grippers on the rotating head when the carriage reaches the limit of its forward movement.

Any preferred means may be employed for quickly withdrawing the cores prior to the time when the cables are severed.

*Engagement of coiling heads with ends of cables.*

After such length of cable has been formed and cut off the carriage reverses its movement and the coiling heads on the other face of the carriage are now brought into operation, and draw along with them the necessary wires to produce cables at that side of the carriage. The face of the carriage that carries the coiling heads that are not in action is for the time being properly designated as the "front" face of the carriage, while the face that carries the coiling heads that are for the time being grasping and coiling the wires being pulled along by the advance of the carriage may properly be termed the "rear" face of the carriage.

When the carriage reaches the limit of its movement it is desirable that the ends of the cables and the ends of the cores within said cables be automatically gripped by the grippers on the coiling heads, so that when the carriage begins its reverse movement the cables and cores will be pulled along with the carriage. It is for the purpose of permitting this automatic engagement that I provide the sliding feature of the guide and cutter bar $90^{c'}$, and the lugs or collars $134^{c'}$ are so located upon the rod 99 connecting the swinging cutter arms that the engagement of the lugs $40^a$ on the carriage with the appropriate collar on the rod 99 will not only turn the cutter bar at the rear to shear off the cable, but will, in advance of this action, slide the guide and cutter bar (indicated at $90^{c'}$, Fig. 14) toward which the carriage is moving so as to expose the end of the cable and core contained therein, as represented at the left in Fig. 14 of the drawings. This exposed end of the cable and core (here represented by reference character $67^{c'}$) will enter the bushing $70^{c'}$ of the coiling head on the front face of the carriage until its end is between the cam grippers $58^{c'}$ (Fig. 7), and when the end of the cable and core is brought properly between said cam grippers the sleeve $60^{c'}$ (Fig. 7) will be moved by engagement of the lever $64^{c'}$ with the head $136^{c'}$ of a sliding rod $137^{c'}$. This rod is arranged in a tube $138^{c'}$, and its stem is surrounded by a compression spring $139^{c'}$. (Figs. 1, and 17.) Movement of the lever $64^{c'}$ under tension of the spring surrounding the rod $137^{c'}$ will cause the sleeve 60' to turn the cam grippers $62^{c'}$ so as to grasp the end of the cable and the core contained within it, thereby firmly clamping these parts to the rotating coiling and gripping head. When the carriage travels in the opposite direction the lever $64^{c'}$ will at the predetermined point in the movement of the carriage engage the lug $44^{c'}$ moving the sleeve $60^{c'}$ in the opposite direction and opening the grippers, thereby permitting the end of the cable and coiler held by said grippers to drop away from the coiling head. After this action takes place the coil will be withdrawn from the completed cable section, the section will be severed by the action of the swinging cutter bar, and the severed section will drop into a suitable trough or receptacle 135 arranged in the lower part of the frame. The operation of the machine will be repeated as long as wires for the cables are supplied thereto.

*Operation.*

Assuming the engagement of the clutch $29^a$ with the pulley $27^a$, the carriage moving in the direction of the arrow in Fig. 2, and its position as in Figs. 1 and 2, the cable has been coiled to substantially its full length and a slight further movement in the direction of the arrow in Fig. 1, to the position shown in Fig. 22, will move the gripper lever $64^c$ to the position shown in Fig. 18, and by sliding the sleeve $60^c$ will release the cable $67^c$ and core $77^c$ from the grippers $58^c$. The cable will then be disengaged from the coiling head $54^c$, as indicated by dotted lines in Fig. 2, and simultaneously a lug 132 on the carriage 40 engages a collar $133^{c'}$ fixed on the rod 115. (Figs. 1 and 2.) The further progress of the carriage carries the rod 115 along to move the cross frame $111^c$ and draw out the core $77^c$ from the coiled cable $67^c$. (In the practical operation of the machine means are provided, not shown herein, for stopping the withdrawal of the core with its end just back of the point where the cable is secured.) When the core $77^c$ has been withdrawn, the rod 115 sliding loosely through the cross frame 111 at the opposite end of the machine to a position just back of the cutter arm $92^c$, an ear $40^a$ on the carriage 40 engages a collar $134^c$ fixed on the rod 99 (see Fig. 14) moving the cutter arm $92^c$ to the dotted line position in Fig. 9 and severing the cable $67^c$ as heretofore described, the cable dropping to the receiving trough 135. Just previous to the cutting operation the cutter bar $90^{c'}$ has been pushed forward by the rod 99, as shown in Figs. 14 and 18, the bar $90^{c'}$ sliding in the bearing $91^{c'}$ until stopped by the bracket $98^{c'}$ and the end of the cable $67^{c'}$ has emerged from the end of the bar $90^{c'}$. Shortly before the carriage lug $40^a$ engages the collar $134^{c'}$ on the rod 99, the gripper lever $64^{c'}$ engages with the head $136^{c'}$ of the sliding rod $137^{c'}$, arranged in a tube $138^{c'}$, and under tension by means of a coiled compression spring 139$^{c'}$. (See Figs. 17 and 18.) The lever 64$^{c'}$ is prevented from backward movement while compressing the spring 139$^{c'}$ either by means of the ball 71$^{c'}$, spring-pressed into notch 72$^{c'}$ in the coiler head 55, as shown in Fig. 7, or preferably by the bell crank lever 73 engaging the lever 64$^{c'}$, as shown in Fig. 21. When the spring 139$^{c'}$ has been compressed in the tube 138$^{c'}$ until the head 136$^{c'}$ of the rod 137$^{c'}$ strikes against the end of the tube, a further movement throws the lever 64$^{c'}$ forcibly backward to the position shown in Fig. 17, closing the grippers. Shortly before this occurs the projecting end of the cable 67$^{c'}$ has entered between grippers 58$^{c'}$ as shown in Fig. 17 and the bell crank 73 (Fig. 21) has been released from the lever 64$^{c'}$ by the crank arm 73$^B$ striking lugs 73$^{c'}$. The position shown in Fig. 17 represents the extreme forward travel of the carriage 40 toward the driving end of the machine, and slightly before this position has been reached, the carriage 40 engages a stop lug 137$^a$ on the clutch controlling bar 33, causing the last short movement of the carriage 40 to disengage the clutch 29$^a$ from the pulley 27$^a$, and connect the shaft 28 to the pulley 27, running in the opposite direction. The carriage will then commence the reverse travel. The cable 67$^{c'}$, having been gripped in the rotating coiling head 54$^{c'}$, the operation of coiling the cable will then be repeated, with the carriage traveling in the reverse direction. The tension of the spring 139$^{c'}$ against the lever 64$^{c'}$ for a short interval at the beginning of the reverse coiling and travel keeps the grippers 58$^{c'}$ firmly against the cable and prevents slippage between the cable and grippers at the start when the cable is short, the elasticity of the cable and the inertia and frictional resistance of the gripper parts being sufficient to prevent slippage during the rest of the travel of the carriage.

When the carriage reaches a predetermined point in its travel and the cable 67$^{c'}$ is of the required length, the wires are released from the grippers 58$^{c'}$ by the lever 64$^{c'}$ striking the lug 44$^{c'}$. The cams 44$^c$ and 44$^{c'}$ and levers 64$^c$ and 64$^{c'}$ are arranged respectively upon different vertical planes to avoid interference of the parts in passing. The operations of removing the core 77$^{c'}$ from the cable 67$^c$, cutting the cable 67$^{c'}$, compressing the spring 139$^c$, uncovering the cut end of the cable 67$^c$ in the cutter bar 90$^c$, gripping the cable and again reversing the travel of the carriage, all proceed in the same sequence and manner as described with reference to the cable 67$^{c'}$.

It will be seen that the coiling operation is practically continuous, and that one or more cables are always being coiled, the operation shifting from one end of the machine to the other. Furthermore, the number of cables coiled at the same time in the machine is dependent on the size of the carriage 40, and the number of coiling units. While I have in the present instance, shown four coiling units, this number of units in a machine is not arbitrary and may be varied. The number of wires required to form a closely wound cable is, of course, determined by the diameter of the wire and the helix of the spiral, or the advance of the carriage 40 for each revolution of the coiler heads. This advance is dependent on the pitch of the worm or screw shaft, and ratio of the gears 47 and 53.

After these factors are once determined they cannot vary and the results are closely woven uniform cables at all times.

The actuating collars 133$^c$, 133$^{c'}$, 134$^c$, 134$^{c'}$ and lugs 44$^c$ and 44$^{c'}$, are preferably made adjustable as to longitudinal position on the machine, to secure a correct timing and sequence of the various periodical functions of the machine, and also for adapting the machine to the manufacture of various lengths of cables.

From the foregoing description it will be noted that this machine is automatic in its action as long as the wires composing the cables are delivered thereto; that cables of varying length may be formed, and the number of cables depends upon the number of coiling units in the carriage. There will, of course, be as many cores as there are cables formed, the core withdrawing mechanism being actuated before the severing mechanism cuts the cable, the gripping jaws of the coiling head having been previously released to allow the withdrawal of the cores and allowing the cables to drop to the floor or into some suitable receptacle when severed. The coiling units are positively driven from the screw, and all of them have the same coiling speed, and are operated simultaneously as the carriage travels from one end of the machine to the other. Provision being made for the automatic shifting of the drive, no attention of the operator is required when the carriage reaches the end of its travel, and as soon as the grippers are operated to clamp the ends of the adjacent wires, the return movement will begin and another group of cables will be formed. The back and forth operation of the carriage will be continued until the desired supply of cables is obtained.

Various modifications of the detailed construction of the machine may be made without departing from the principle and scope of the invention and I do not, therefore, limit myself to the exact construction shown and described.

I claim as my invention:

1. A wire cable forming machine comprising, in combination, a frame, a carriage mounted to travel forward and backward thereon, wire coilers mounted on said carriage and coöperating with stationary coil formers for forming a wire cable on the forward movement of the carriage, and a similar cable on the backward movement thereof.

2. A wire cable forming machine comprising, in combination, a frame, a carriage mounted to travel forward and backward thereon and mechanism rendered operative during the movement of said carriage for forming a wire cable on the forward movement of the carriage and a similar cable on the backward movement thereof.

3. A wire cable forming machine comprising, in combination, a frame, a carriage mounted to travel forward and backward thereon, and mechanism for forming a wire cable on the forward movement of the carriage, and a similar cable on the backward movement thereof, said mechanism being rendered operative by the movement of said carriage.

4. A wire cable forming machine comprising, in combination, a frame, a carriage mounted to travel forward and backward thereon, and mechanism operated during the movement of said carriage for forming a wire cable on the forward movement of the carriage and a similar cable on the backward movement thereof.

5. A wire cable forming machine comprising, in combination, a frame, a carriage mounted to travel forward and backward thereon, mechanism actuated by the movement of said carriage for forming a wire cable on the forward movement of the carriage and a similar cable on the backward movement thereof, and means for severing the lengths of cables at predetermined points in the travel of the carriage.

6. A wire cable forming machine comprising, in combination, a frame, a carriage mounted to travel forward and backward thereon, mechanism actuated by said carriage for forming a wire cable on the forward movement of the carriage and a similar cable on the backward movement thereof, cable severing means and means actuated at predetermined points in the travel of the carriage for operating said cable-severing means.

7. A wire cable forming machine comprising, in combination, a frame, coil formers arranged near the ends of said frame, a carriage mounted to travel forward and backward on said frame, rotatable means mounted on said carriage for gripping a plurality of wires simultaneously, one group of wires being gripped and rotated when the carriage is moving in one direction and another group of wires being gripped and rotated when the carriage is moving in the opposite direction, cable severing means located in proximity to said formers and means actuated at predetermined points in the travel of said carriage for operating said cable severing means.

8. A wire cable forming machine comprising, in combination, a frame, coil formers located near the ends of said frame, a carriage mounted to travel forward and backward on said frame, mechanism mounted on said carriage and coöperating with said coil formers for coiling simultaneously a series of wires engaging the coil former at one end of the machine when the carriage is moving in one direction, and for coiling another series of wires engaging the coil former at the other end of the machine when the carriage is moving in the opposite direction.

9. A wire cable forming machine comprising, in combination, a frame, coil formers located near the ends of said frame, a carriage mounted to travel forward and backward on said frame, mechanism mounted on said carriage and coöperating with said coil formers for coiling simultaneously a series of wires engaging the coil former at one end of the machine when the carriage is moving in one direction, and for coiling another series of wires engaging the coil former at the other end of the machine when the carriage is moving in the opposite direction, and means for automatically shifting the direction of movement of the carriage.

10. A wire cable forming machine comprising, in combination, a frame, coil formers located at opposite ends thereof, a carriage mounted to travel forward and backward on said frame, rotating coiling heads mounted on said carriage for forming, in conjunction with said coil formers, a cable on the forward movement of said carriage, and a similar cable on the backward movement thereof, means for releasing the ends of the formed cables from said coiling heads at predetermined points in the travel of the carriage, and means for thereafter severing the cables at predetermined points in the travel of the carriage.

11. A wire cable forming machine comprising, in combination, a frame, a carriage mounted to travel thereon, wire gripping heads mounted for grasping a plurality of wires to form a cable, means for releasing said wires at a predetermined point in the travel of said carriage, and mechanism actuated by said carriage for severing the completed cable.

12. A wire cable forming machine comprising, in combination, a suitable frame, wire gripping mechanism mounted for longitudinal reciprocation on said frame, a core held by said gripping means and around which the cable forming wires are coiled, means for withdrawing the core from said cable and means for thereafter severing the completed cable in proximity to the end of the withdrawn core.

13. A wire cable forming means comprising, in combination, a suitable frame, coil formers located at the opposite ends of said frame, wire gripping mechanism mounted for movement lengthwise of said frame, a core held by said gripping means and around which the wires are coiled, means for withdrawing the core from said cable, and means for thereafter severing the completed cable.

14. The combination, with a coil former having means for guiding a series of wires on spiral lines therethrough, of a movable carriage, means for moving said carriage toward and from said former, a rotatable coiling head mounted on said carriage in alinement with said former, means on said coiling head for gripping a series of wires extending through said former, and means for rotating said coiling head as said carriage is moved away from said former.

15. The combination, with a coil former having means for guiding a series of wires on spiral lines therethrough and permitting the simultaneous passage of a core, about which said wires are coiled, of a movable carriage, means for moving said carriage toward and from said former, a rotatable coiling head mounted on said carriage in alinement with said former, means on said coiling head for gripping the series of wires and the core extending through said former, and means for rotating said coiling head as said carriage is moved away from said former.

16. The combination, with a coil former having means for guiding a series of wires on spiral lines therethrough, of a movable carriage, means for moving said carriage toward and from said former, a rotatable coiling head mounted on said carriage in alinement with said former, means on said coiling head for gripping said wires and means for closing and opening the gripping means on the coiling head to grip and release the wires extending from said former, and means for rotating said coiling head as said carriage is moved away from said former.

17. The combination, with a coil former having means for guiding a series of wires on spiral lines therethrough, of a movable carriage, means for moving said carriage toward and from said former, a rotatable coiling head mounted on said carriage in alinement with said former, means on said coiling head for gripping said wires, means for rotating said coiling head as said carriage moves away from said former, and means for releasing said wires from the coiling head at a predetermined point in the travel of said carriage.

18. The combination, with a coil former, having means for guiding a series of wires on spiral lines therethrough, of a movable carriage, means for moving said carriage toward and from said former, a rotatable coiling head mounted on said carriage in alinement with said former, means on said coiling head for gripping said wires, means for rotating said coiling head as said carriage moves away from said former, means for releasing said wires from the coiling head at a predetermined point in the travel of said carriage, and means for severing said wires in proximity to said former.

19. The combination, with a coil former having means for guiding a series of wires on spiral lines therethrough and permitting the simultaneous passage of a core, about which said wires are coiled, of a movable carriage, means for moving said carriage toward and from said former, a rotatable coiling head mounted on said carriage in alinement with said former, means on said coiling head for gripping the series of wires and the core extending through said former, means for rotating said coiling head as said carriage is shoved away from said former, means for releasing said wires and core from said coiling head when the carriage has reached a predetermined point in its travel, and means for thereafter withdrawing said core.

20. The combination, with a coil former having means for guiding a series of wires on spiral lines therethrough, and permitting the simultaneous passage of a core, about which said wires are coiled, of a movable carriage, means for moving said carriage toward and from said former, a rotatable coiling head mounted on said carriage in alinement with said former, means on said coiling head for gripping the series of wires and the core extending through said former, means for rotating said coiling head as said carriage is shoved away from said former, means for releasing said wires and core from said coiling head when the carriage has reached a predetermined point in its travel, means for thereafter withdrawing said core, and severing said wires in proximity to said former.

21. In a machine of the class described, the combination, with means for coiling a series of wires around a central core, of means for withdrawing said core from a predetermined portion of the formed coil, and means for severing, in proximity to the end of the withdrawn core, the portion of the coil from which the core has been withdrawn.

22. In a machine of the class described, the combination, with a coil former, of a slidable guide through which the coiled wires pass after they leave said former, a reciprocating carriage, a coiling head mounted on said carriage and means for moving said guide and exposing the end portion of the coiled wires as the coiling head approaches said guide.

23. In a machine of the class described, with oppositely located coil formers, of a movable carriage arranged to reciprocate between said formers, oppositely facing coiling heads mounted on said carriage and provided with means for gripping the wires passing through each former, and means for rotating said heads as said carriage reciprocates whereby a coiled cable is formed by the movement of each coiling head away from the coöperating former.

24. In a machine of the class described, the combination, with a reciprocating carriage, a plurality of oppositely facing coiling heads mounted therein, and means for rotating said heads as said carriage is moved, of a corresponding series of coil formers located near the ends of the machine, and means provided on each coiling head for gripping the wires passing through the coöperating coil former and drawing said wires through the former as the carriage travels away from said former, whereby a plurality of cables are formed with each movement of said carriage.

In witness whereof, I have hereunto set my hand this 29th day of January, 1920.

EDWARD TURGEON.